United States Patent [19]

Nagashima

[11] Patent Number: 4,516,212
[45] Date of Patent: May 7, 1985

[54] CONTROL SYSTEM FOR ROLL GRINDING MACHINE

[75] Inventor: Kazuo Nagashima, Shizuoka, Japan

[73] Assignee: Toshiba Kikai Kabushiki Kaisha, Tokyo, Japan

[21] Appl. No.: 406,911

[22] Filed: Aug. 10, 1982

[30] Foreign Application Priority Data

Aug. 20, 1981 [JP] Japan .................................. 56-130732

[51] Int. Cl.³ ........................ G06F 15/46; G05B 19/18
[52] U.S. Cl. ........................................ 364/475; 51/49; 51/165.71; 51/165.92; 364/511
[58] Field of Search ................ 364/474, 475, 167–171, 364/511, 483; 51/165.92, 165.71, 34, 35, 49; 318/571, 650

[56] References Cited

U.S. PATENT DOCUMENTS

| | | | |
|---|---|---|---|
| 3,699,720 | 10/1972 | Lenning | 318/571 X |
| 3,811,228 | 5/1974 | Nagashima et al. | 51/165.71 X |
| 4,071,980 | 2/1978 | Kubo | 51/165.92 X |
| 4,218,850 | 8/1980 | Sakai et al. | 51/49 |
| 4,371,941 | 2/1983 | Gordiski et al. | 51/165.71 X |

*Primary Examiner*—Joseph F. Ruggiero
*Attorney, Agent, or Firm*—Cushman, Darby and Cushman

[57] ABSTRACT

An adaptive control system for a roll grinding machine. A desired radius as a function of longitudinal direction of the roll is preprogrammed. A power driven grinding wheel is applied to the roll and power to the grinding wheel is monitored. For each longitudinal position of the grinding wheel, the actual radius of the roll is measured and the desired radius noted. From these numbers, a desired power for driving the grinding wheel is computed. The actual power is compared with the desired power and the pressure of the grinding wheel against the roll is adjusted accordingly.

28 Claims, 16 Drawing Figures

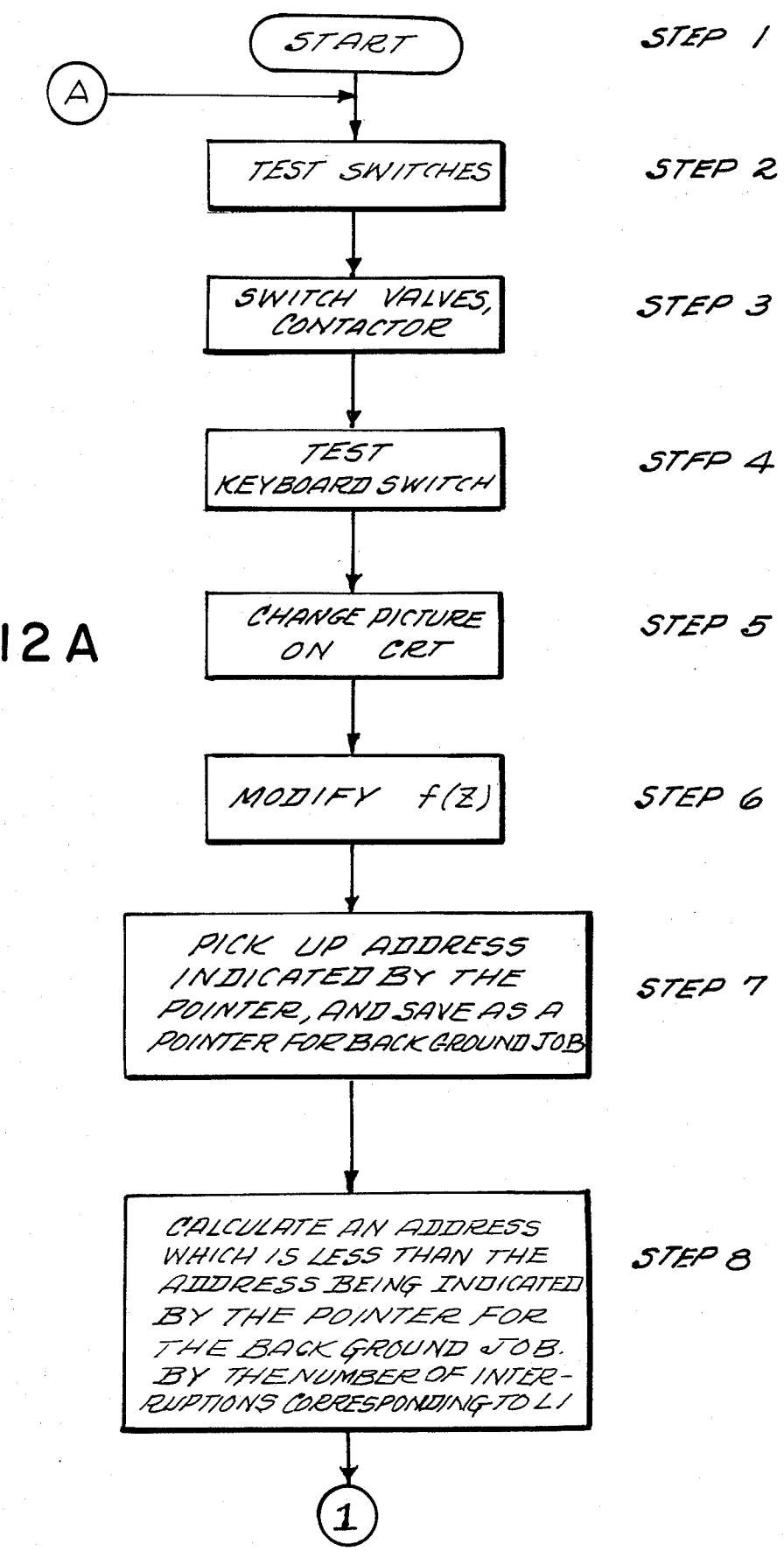

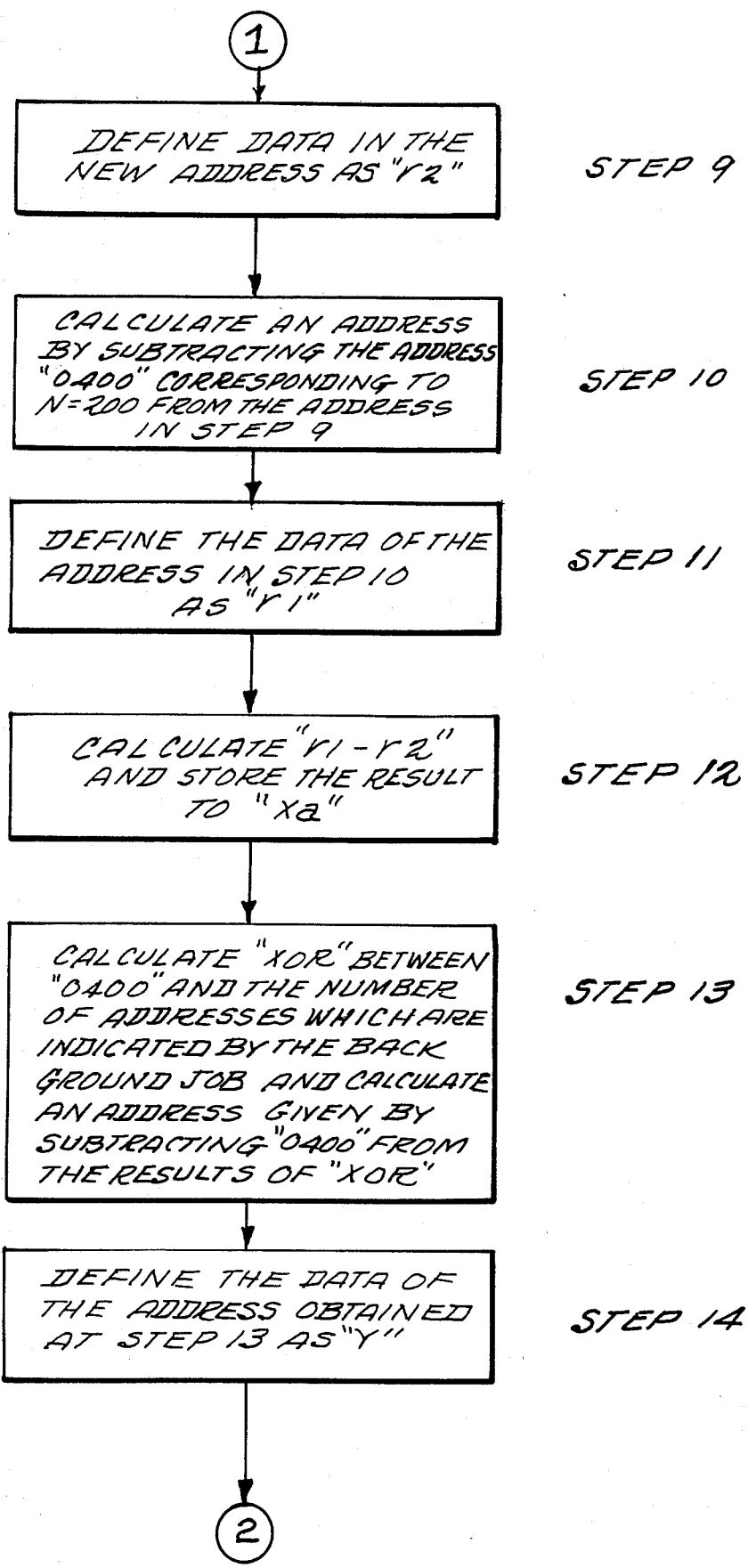
FIG. I2B

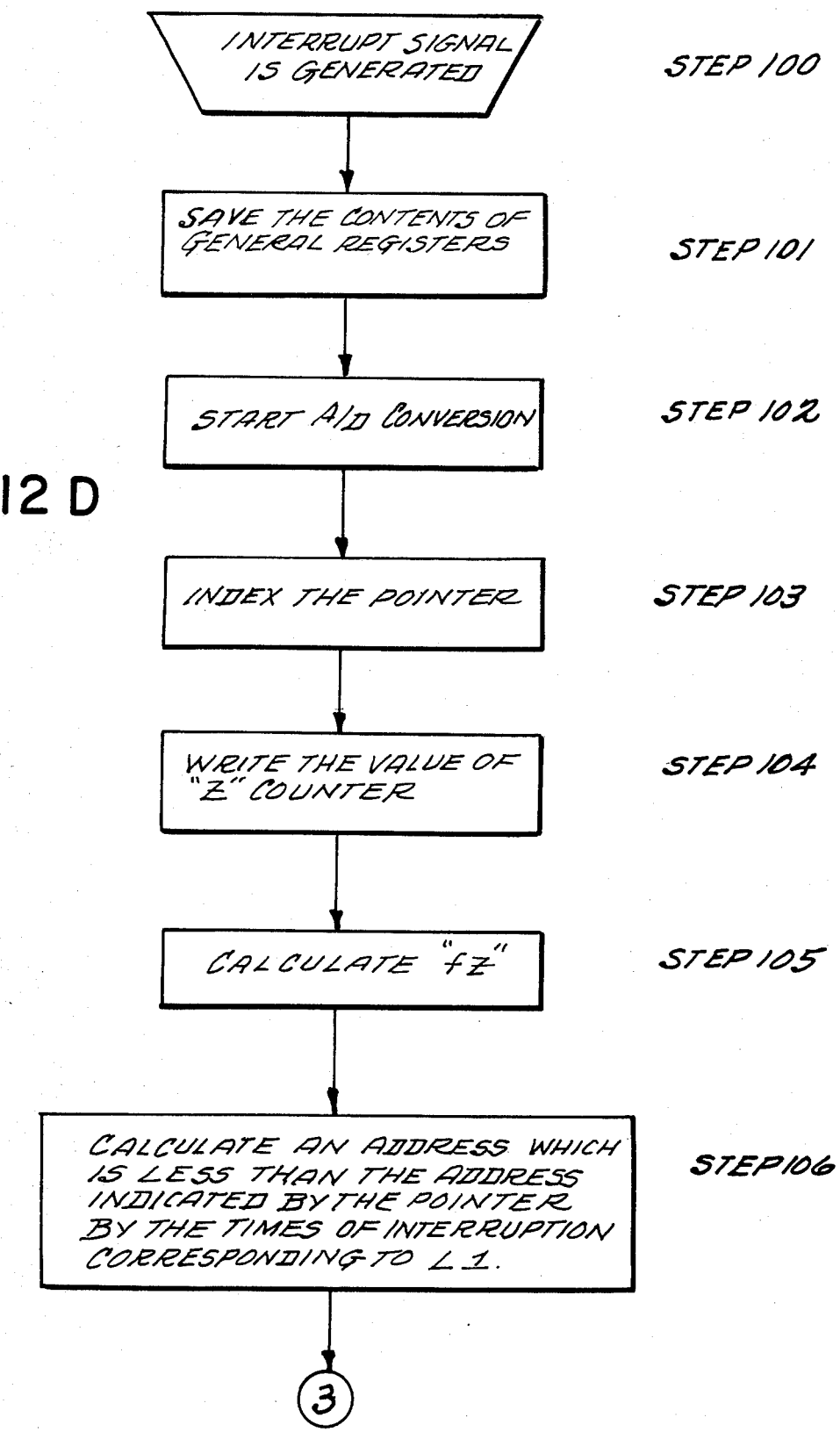

4,516,212

CONTROL SYSTEM FOR ROLL GRINDING MACHINE

BACKGROUND OF THE INVENTION

1. Field of the Invention

The present invention relates to roll grinding machines of the type used to provide a precise grinding finish to rolls such as those used in rolling mills and paper manufacturing machines. In general, it provides an adaptive control system for controlling a roll grinding machine. It is particularly well suited for controlling the grinding of a roll held by chocks which arrangement tends to create a rigidity problem.

2. Description of the Prior Art

In order to achieve precise grinding of the surface of a roll, it is desirable to maintain a high degree of rigidity between a grinding wheel of the roll grinding machine and the surface of the roll being ground. One way to achieve this desired rigidity, known in the prior art, is to make the roll grinding machine very large. Of course, by making the machine large, the complexity of the machine and its cost of production become great. It has heretofore not been possible using smaller roll grinding machine to achieve the desired level of rigidity between the machine's grinding wheel and the roll surface so that the grinding wheel can be moved accurately in a straight or curved path along the roll surface.

SUMMARY OF THE INVENTION

It is, therefore, the primary object of the present invention to provide an adaptive control system which enables even a roll grinding machine having insufficient rigidity and moving inaccuracy to perform its grinding operation highly accurately.

To achieve this primary object, the present invention provides a control system for a roll grinding machine, comprising:

means for rotating a roll to be ground;
a grinding wheel for grinding the roll;
means for rotating the grinding wheel;
means for moving the grinding wheel longitudinally parallel to an axis of the roll;
means for sensing the power being expended by the grinding wheel rotating means and generating an actual power signal indicative thereof;
means for detecting an actual radius of the roll at the longitudinal postion of the grinding wheel and producing an actual radius signal indicative thereof;
means for detecting the longitudinal position of the grinding wheel and generating a longitudinal position signal indicative thereof;
desired radius producing means for producing a desired radius signal representing a desired radius responsive to the longitudinal position signal; and
desired power producing means for producing, responsive to a predetermined function of the actual and desired radius signals, a desired power signal; and
grinding wheel driving means for driving the grinding wheel against the roll with a pressure that is a function of the desired power signal so as to minimize any difference between actual and desired power.

In the preferred exemplary embodiment, all calculation functions are carried out by a computer. However, a computerized embodiment is a matter of convenience. In the alternative, hard wired logic circuits and other elements could be utilized.

BRIEF DESCRIPTION OF THE DRAWINGS

The various features and advantages of the invention will become apparent from the following detailed description of a preferred exemplary embodiment and the appended claims, forming a part of this description when read in conjunction with the accompanying drawings wherein:

DETAILED DESCRIPTION OF THE PREFERRED EMBODIMENTS

Figure 1:
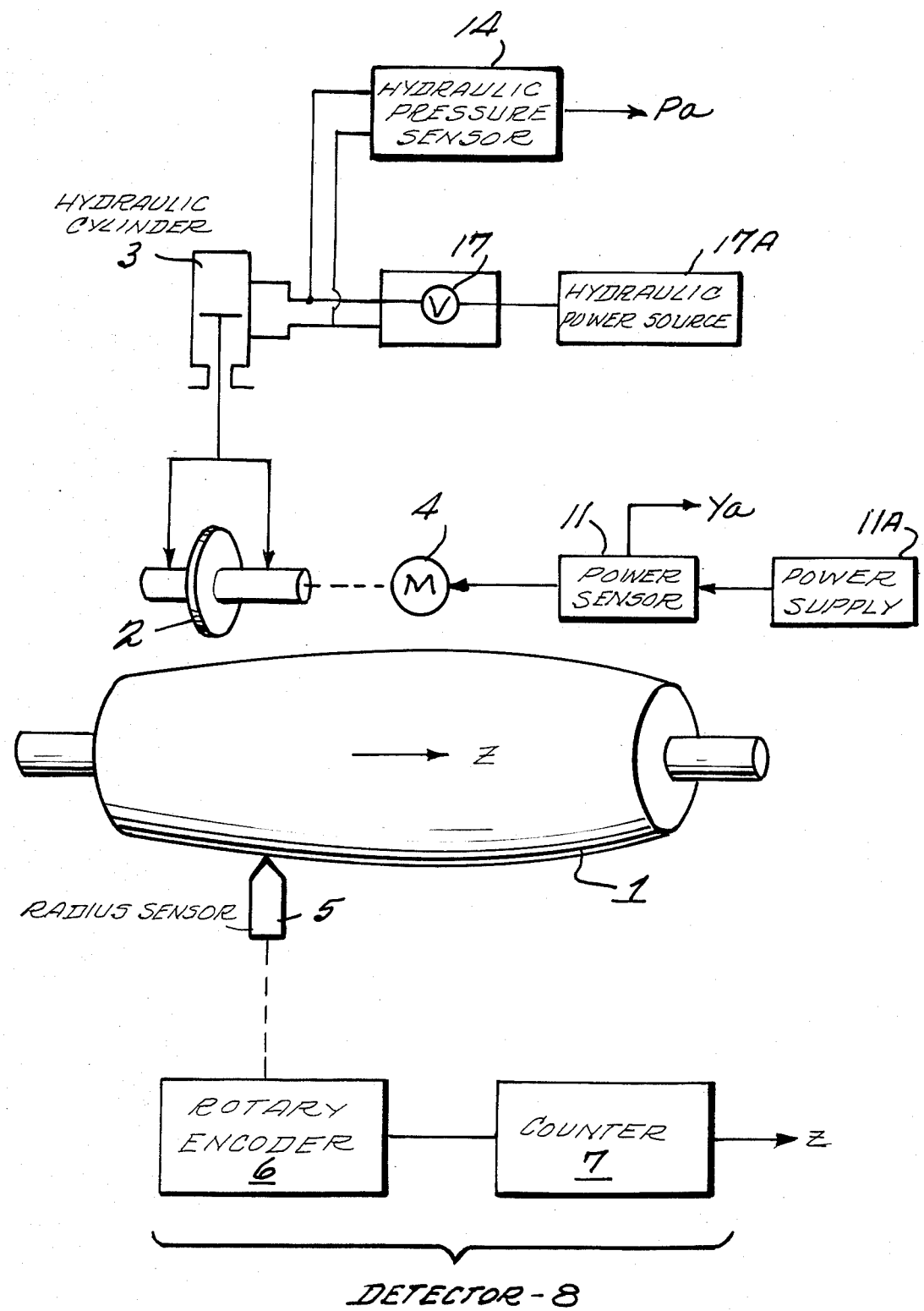
FIG. 1 is a schematic and pictorial diagram of the main parts of a roll grinding machine intended to be controlled by the control system of the present invention.

FIG. 1 schematically shows the grinding operation of a roll 1 to be ground. A grinding wheel 2 is pressed against the roll 1 by the action of a hydraulic cylinder 3 and is traversed along the axial directions of roll 1 while being rotationed by an electric motor 4. A radius sensor 5 is arranged on a circumferential position of roll 1 at an angular position around the roll that is different from the angular position around the roll of grinding wheel 2. Radius sensor 5 is so controlled that it is positioned at the same longitudinal position as that of grinding wheel 2 in the axial direction (Z) of roll 1. Radius sensor 5 is axially moved together with grinding wheel 2 thereby to detect the radii of the respective points of the roll 1. For radius sensor 5, there can be used a sensor such as shown FIG. 3 or 4, described hereinafter.

A rotary encorder 6 is coupled to radius sensor 5 for generating pulses in accordance with the axial movement of the radius sensor relative to roll 1. A counter 7 is coupled to an output of encoder 6 for counting the output pulses therefrom and generating digital signals indicating the axial position of radius sensor 5 and, accordingly the axial position of grinding wheel 2 relatively to roll 1. Rotary encoder 6 and counter 7 together constitute a detector 8 for detecting the axial position, i.e. the position in the direction of the axis Z, of sensors and accordingly, grinding wheel 2 relative to the roll 1.

A power sensor 11 is provided for detecting the electric current being supplied from a power supply 11A to motor 4.

A hydraulic pressure sensor 14 is provided for detecting which the hydraulic pressure at an output of a hydraulic servo valve 17 supplying hydraulic liquid to hydraulic cylinder 3 from a hydraulic power source 17A.

Figure 2:
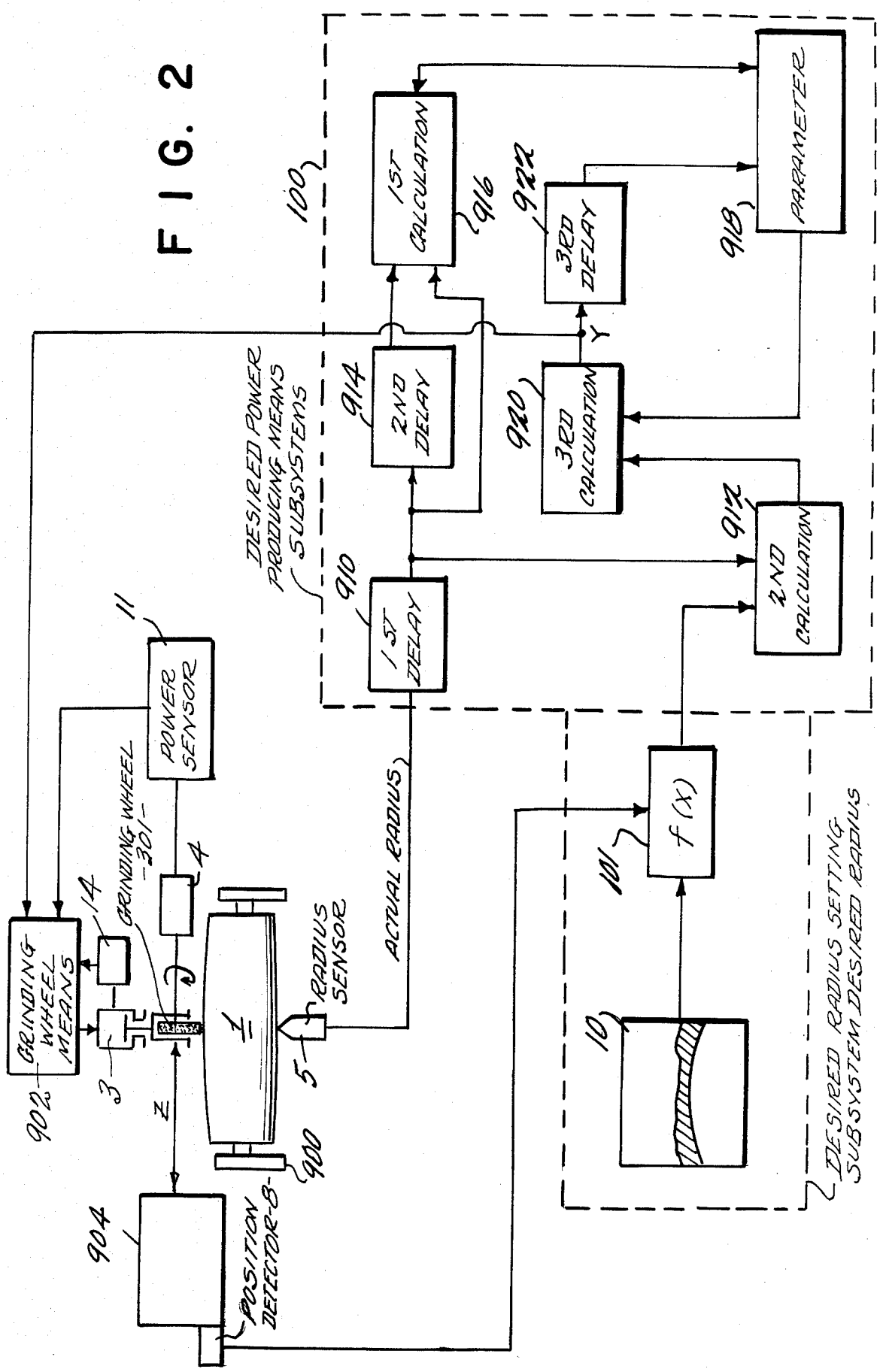
FIG. 2 is a functional block diagram of the control system according to the present invention.

Referring now to FIG. 2 there is shown a functional block diagram of the control system according to the present invention. Roll 1 to be ground is shown driven by roll rotating means 900. Grinding wheel 301 is pressed against roll 1 by a hydraulic cylinder 3 which exerts a pressure on the grinding wheel in accordance with a signal derived from grinding wheel driving means 902 which includes elements 308, 209 and 310. A hydraulic pressure sensor 14 senses the pressure in cylinder 3 and feeds back a signal to the grinding wheel driving means 902 indicative thereof. A longitudinal drive means 904 drives the grinding wheel 301 longitudinally along the roll at a predetermined rate of positional change with respect to the roll. A position detector 8 coupled to longitudinal drive means 904 provides a signal indicative of the longitudinal position of grinding wheel 301. Grinding wheel 301 is rotated by motor 4. The power exerted by motor 4 is measured by power sensor 11 which feeds a signal to grinding wheel driving means 902 indicative thereof. Radius sensor 5 positioned at a point around the circumference of roll 1 corresponding to the position of grinding wheel 301 provides an actual radius signal indicative of the radius of roll 1 at its current longitudinal position.

The control system operates responsive to the actual radius signal developed by radius sensor 5 and the position sensor 8 indicating the longitudinal position of the grinding wheel to develop a signal ultimately used by the grinding wheel driving means 902 to apply the correct amount of pressure to the grinding wheel to cause it to grind roll 1 to the desired radius.

The desired radius is set by a setting means 10. In essence, setting means 10 is human interactive so that the desired radius as a function of longitudinal position can be set. The output of setting means 10 is coupled to a function block 101 which, responsive to the longitudinal position signal from detector 8, develops a signal indicative of a desired radius at a particular longitudinal position.

The actual radius signal from radius sensor 5 is delayed by a first delay 910 for delaying the actual radius signal for a first time period representing the time interval required for the roll to rotate from the circumferential position of the roll at which the radius sensor is positioned to the circumferential position of the roll at which the grinding wheel is positioned.

The output from first delay 910 and from function block 101 are coupled to a calculating device 912 for calculating the amounts of radius to be removed at the particular longitudinal position of the grinding wheel and radius sensor. The output of first delay 910 is also coupled to a second delay 914 for delaying the output signal from the first delay 910 for delaying the output signal from the first delay for a second time period representing the time interval required for the roll to circumferentially rotate once. The output of second delay 914 and first delay 910 are coupled to a calculating device 916 for determining the amount of radius actually removed. The output of calculator 916 is coupled as one input to a parameter calculator 918 for calculating parameters defining the relationship between the amount of radius to be removed and the power to be applied to the grinding wheel. These parameters calculated by parameter calculator 918 are coupled to a power calculator 920 which responsive to the signal from calculator 912 develops a desired power signal Y for coupling to the grinding wheel driving means 902. The desired power signal Y is subjected to a delay by a third delay 922. Third delay element 922 provides a delay for a time corresponding to the interval required to make one rotation. The output signal from third delay 922 serves as a second input to parameter calculator 918. Thus, a secondary feedback loop is formed from the output of power calculator 920 through the third delay 922 and parameter calculator 918 back to power calculator 920.

The setting means 10 and function block 101 together constitute a desired radius setting sub-system. The first delay element 910, second element 914, calculating circuit 916, parameter calculator 918, calculator circuit 912, power calculator 920 and third delay 922 together constitute a desired power producing sub-system.

Figure 3:
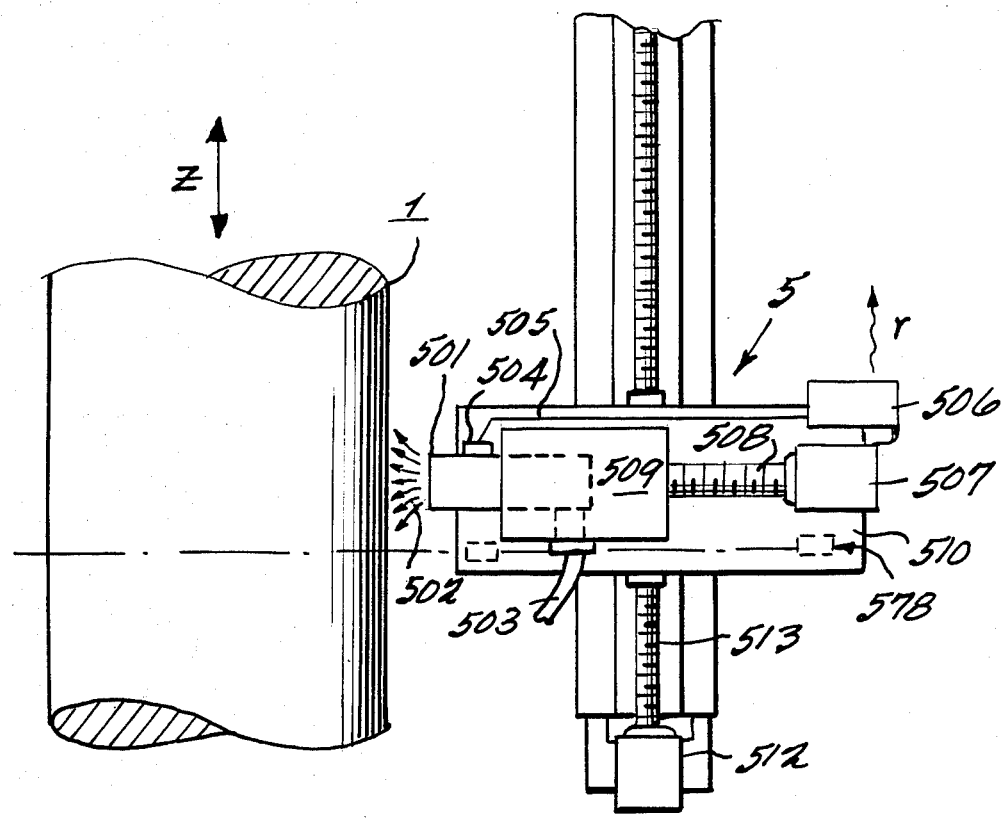
FIG. 3 is a more detailed schematic diagram showing one embodiment of the radius sensor.

Referring now to FIG. 3 there is shown a first embodiment of radius sensor 5. A nozzle 501 is provided to inject an air jet 502 to the surface of roll 1 to be ground. An air supply tube 503 supplies compressed air to nozzle 501. A back pressure detector 504 is provided for detecting the back pressure of the air in nozzle 501. The output of detector 504 is coupled through a lead wire 505 to a pulse motor controller 506 which includes and A/D coverter (not shown). Controller 506 drives a pulse motor 507 which, in turn, drives a feed screw 508. When feed screw 508 is rotated, a nozzle holder 509 holding nozzle 501 is moved in the radial direction of roll 1 toward and away from its surface. Members 501 to 509 thus far described are mounted on a carriage 510 to comprise radius sensor 5. A rail 511 which is located in parallel with the axis "Z" of the roll 1 to be ground. A pulse motor 512 is mounted on rail 511 for rotatably driving a feed screw 513. When feed screw 513 is rotated, radius sensor 5 moves in parallel with the axis "Z" of roll 1.

Controller 506 controls the rotations of pulse motor 507 so that the back pressure detected may be controlled to approach a predetermined level, in other words, it controls the rotational quantity and direction of pulse motor 507 so that the clearance between nozzle 501 and the circumference of roll 1 may keep constant.

At the same time, controller 506 generates a digital signal "r" indicating the radius of roll 1. This signal indicates the roll radius because the roll radius has a predetermined relationship to the position of nozzle 501 and with the accumulated values (which are accumulated while taking the rotational direction into consideration) of the number of the rotations and the rotational angle of pulse motor 507. Incidentally, in order to construct radius sensor 5, a microunit such as the type used in an air micrometer, for example, can be used.

Pulse motor 512 controlled in rotational quantity and direction so that the position of radius sensor 5 in the longitudinal direction (Z) of roll 1 may be identical to that of grinding wheel 2 in the direction Z. As shown in FIG. 3 by numeral 517, 518 radius sensor carriage 510 can be connected mechanically with a carriage guide 309 (FIG. 8) which moves to the directions "Z" and in this case rail 511, feed screw 513, and pulse motor 512 are not required.

Figure 4:
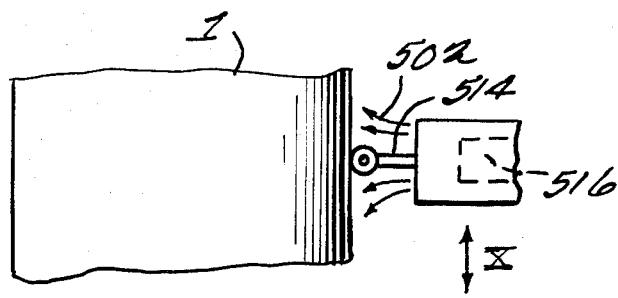
FIG. 4 is a schematic diagram showing a second embodiment of the radius sensor.

FIG. 4 shows an alternative arrangement for radius sensor 5. This arrangement features a head 514 pushed on the surface of roll 1. The displacement of head 514 in the directions perpendicular to Z directions is measured by a electric micrometer and in that case shown in FIG. 3, pulse motor 507 and pulse motor controller 506 do not need but a signal corresponding to radius of the roll is analogue quantity so the signal has to be converted to digital signal by a A/D converter 102, for example shown in FIG. 5.

Figure 5:
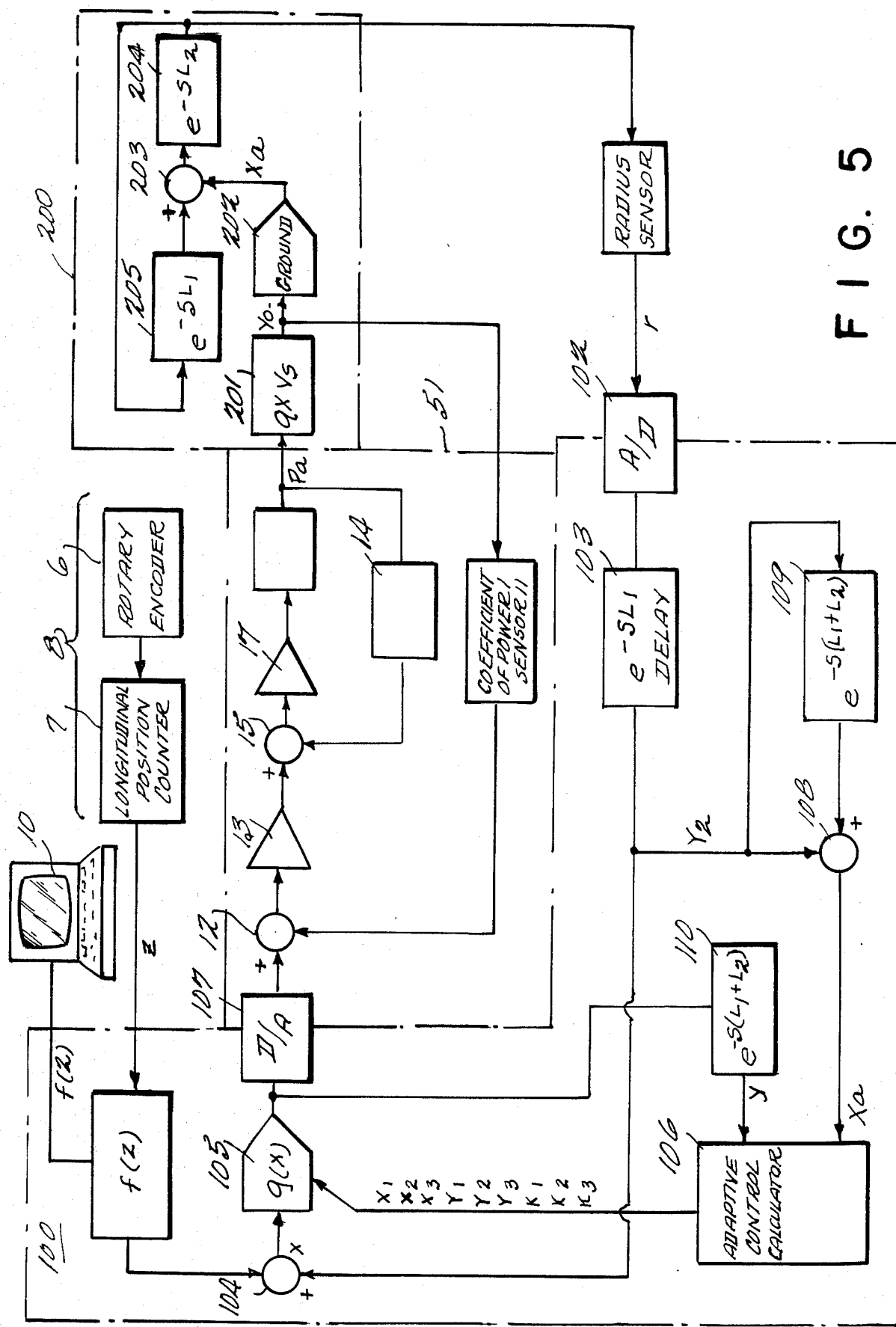
FIG. 5 is a block diagram illustrating the control system function of the present invention.

Referring now to FIG. 5, there is shown a block diagram of a first embodiment of the present invention. In FIG. 5, numeral 100 indicates a computer, e.g., a microcomputer which has its operations shown in a block diagram.

Figure 6:
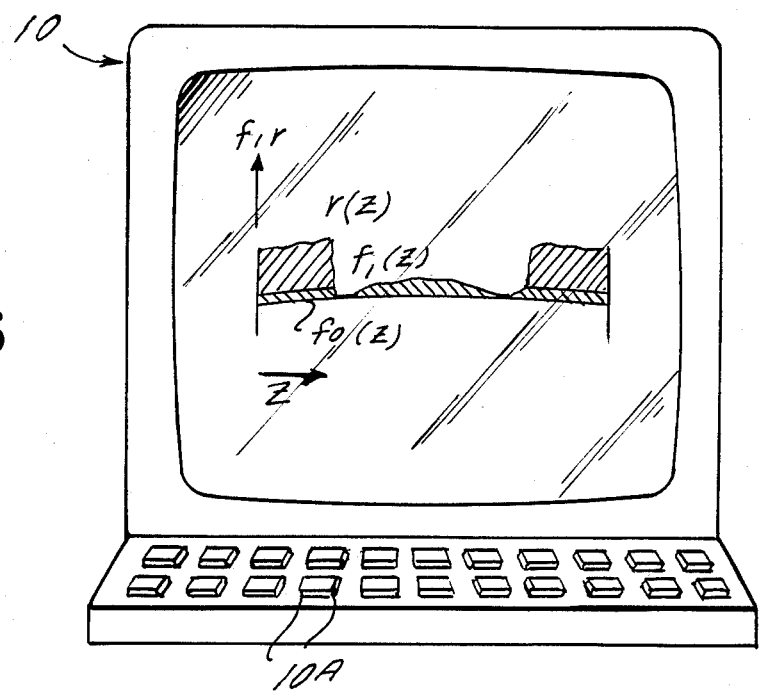
FIG. 6 is a pictorial view of the desired radius setting sub-system.

A cathode ray tube (CRT) 10 provides a display of the actual shape of the roll, which has already been stored in a memory device of computer 100 by the preparatory manipulation of radius sensor 5 and axial position detector 8. CRT 10 is made further operative to receive the desired shape of roll 1 by the use of an accessory light pen and to display the desired shape so received. FIG. 6 shows this in detail.

Referring briefly to FIG. 6 there is shown both the actual shape $r(z)$, which is displayed in the picture frame of the CRT 10, and the desired shapes $f_1(z)$ and $f_0(z)$. Shape $f_1(z)$ is desired for a rough grinding operation and shape $f_0(z)$ is desired for finish grinding operation. When desired shape $f_0(z)$ is entered into the computer using the light pen, the shape $f_1(z)$ is automatically determined by the operations of the computer 100. The control method of the present invention can be applied to both the rough and finish grinding operations, and the following description will be made commonly for both the operations. Thus, a desired shape $f(z)$ is merely used in the following description. It is assumed that $f(z)$ corresponds to desired shape $f_1(z)$ for the rough grinding operation and to desired shape $f_0(z)$ for the finish grinding operation.

Referring again to FIG. 5, desired shape $f(z)$ entered via CRT 10 is stored in the form of a fuction of a variable indicating the axial position Z in setting means 101 of computer 100. This setting means 101 is made responsive to the signal, which is fed at each instant from axial position detector 8 indicating the axial position Z, thereby to generate a signal representing the desired radius f at that position Z. The desired radius f is that at the axial position of the roll, in which in the grinding operation is actually performed by the rotation of grinding wheel 2. On the other hand, the actual radius r is detected by the radius sensor 5 and is subjected to the analog-to-digital conversion by an A/D converter 102. The actual radius is compared with the desired radius by a comparator 104 after the lapse of a predetermined delay time $L_1$ which is determined by delay means 103. The delay time $L_1$ provides a time period which is required for a certain point on the surface of roll 1 to rotate from the position, in which it faces radius sensor 5, to the position in which it faces grinding wheel 2. A desired allowance x, which means an amount to be ground, can be calculated by substracting the desired radius f from the actual radius r.

Power calculating means 105 is made operative to calculate a required power y in accordance with the previously determined desired allowance x. Calculations are performed while assuming that the relationship betwen the desired allowance x and the required power y can be approximately expressed by a graph of broken lines as shown in FIG. 7.

Figure 7:
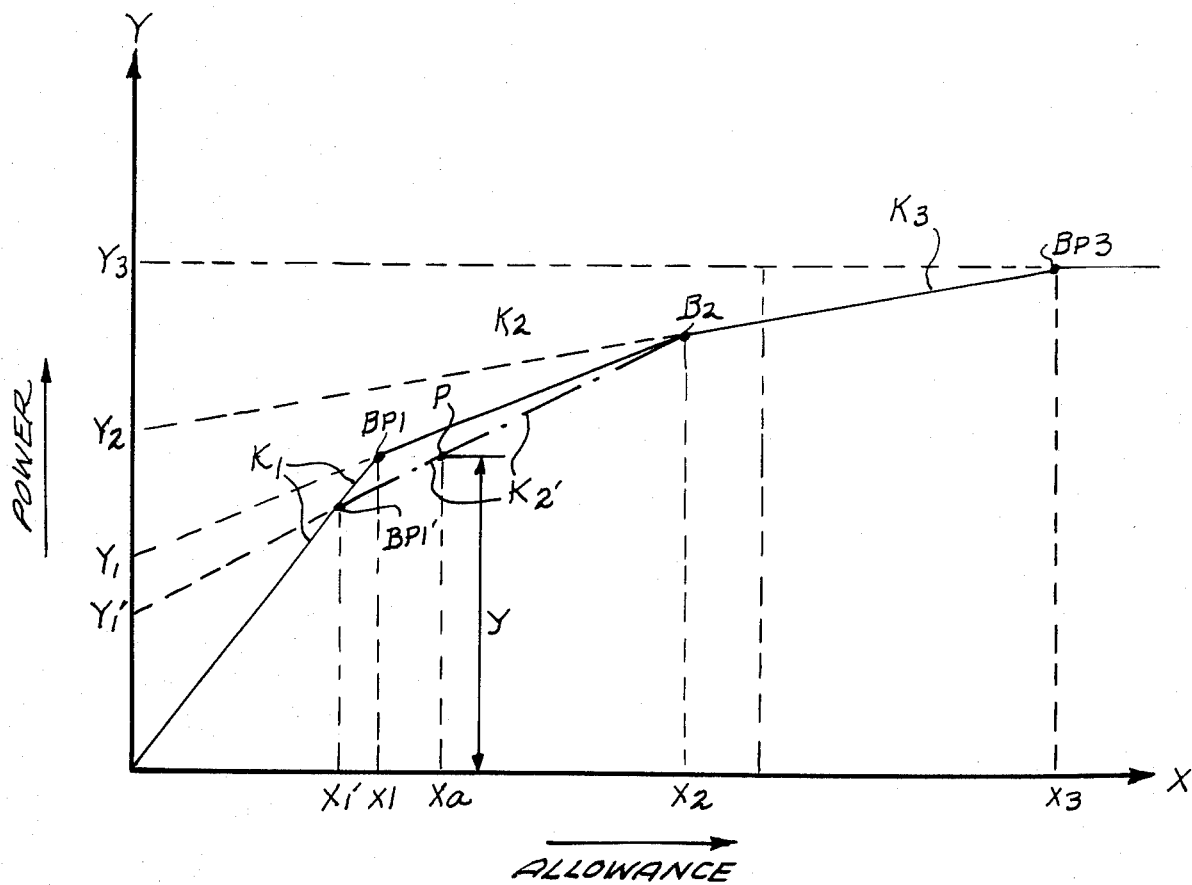
FIG. 7 is a graphical representation illustrating the required power as a function of the radius to be removed.

Referring now to FIG. 7, the broken lines have their broken points located at $x_1$, $x_2$ and $x_3$, and segments o-$x_1$, $x_1$-$x_2$, $x_2$-$x_3$ and $x_3$-oc are expressed by respective straight lines, which have their y-intercepts at o,$y_1$,$y_2$ and $y_3$ and their gradients of $k_1$, $k_2$, $k_3$ and o. These parameters $x_1$, $x_2$, $x_3$, $y_1$, $y_2$, $y_3$, $k_1$, $k_2$, $k_3$ are calculated by adaptive control calculating means 106 so that they are renewed and given. These adaptive control calculating processes are effected each time period (e.g., 0.1 minutes).

The required power y is subjected to the digital-to-analog conversion by a D/A converter 107 and is fed out of the computer 100. The actual power ya is detected by a power sensor 11 on the basis of the input power to motor 4 and is compared with the required power y by a comparator 12. The deviation obtained as a result of the comparison is amplified by an amplifier 13 and is converted into a corresponding required pressure p. Here, the pressure p corresponds to the pressure for hydraulic cylinder 3 to push grinding wheel 2 onto roll 1 to be ground so that it is proportional to the power. The actual power pa is detected by a pressure sensor 14 and is compared with a reference pressure level p by a comparator 15. The deviation obtained as a result of the comparison is amplified by an amplifier 16. Servo-valve 17 is driven by the output of amplifier 16 so that the hydraulic pressure in hydraulic cylinder 3, namely, the pressure to push grinding wheel 2 onto roll 1 is controlled.

The grinding operations in the grinding machine are illustrated as a grinding process 200 in the form of the block diagram expressing a transfer function. The following relationship holds between the pressure (i.e. the force in the normal direction) pa, under which grinding wheel 2 is pushed onto roll 1, and the power ya of the grinding wheel 2:

$$ya = pa \cdot q \cdot vs$$

wherein letter q designtes the conversion coefficient between the pressure pa and the power ya corresponding to the former, and letters vs designate the circumferential speed of grinding wheel 2. A block 201 indicates the aforementioned relationship between the pressure pa and the power ya.

The relationship between the power ya and the ground quantity xa is called the "ground characteristics", which are dependent upon not only such a value as is invariable during the roll grinding operation, for example, the material of the roll 1 to be ground or the specifications of grinding wheel 2 but also such a value as is variable during the grinding operation, for example, the used time period, wear or temperature of grinding wheel 2. Therefore, the grinding characteristics are variable with the time, and in the present invention, there is provided such an adaptive control as varies those parameters when the required power y is to be calculated at required power calculating means 105.

Referring now to grinding process 200, subtraction (203) of ground quantity (i.e., the actual allowance) xa from the radius r before the grinding operation becomes the radius r after the grounding operation which radius r is detected by radius sensor 5 after the lapse (204) of a delay time period $L_2$ here, this delay time period $L_2$ is that for one point on roll 1 to rotate from the position, in which it faces grinding wheel 2, to the position in which it faces radius sensor 5. The sum of the delay times period $L_1$ and $L_2$ is equal to the time for roll 1 to rotate one rotation. The radial portion facing radius sensor 5 is brought to face again grinding wheel 2 after the lapse (205) of the delay time period $L_1$ so that it is subjected to the grinding operations (203).

The radius r detected by radius sensor 5 is subject to the analog-to-digital conversion by A/D converter 102, as has been described hereinbefore, and is fed to the delay means 103. The output of this delay means 103 is fed not only to comparator 104 but also to both a comparator 108 and delay means 109. The output of the delay means 109 is fed to the other input of comparator 108. As a result, comparator 108 compares the radius r at a certain time and the radius r before the lapse of the delay time periods ($L_1+L_2$), i.e., before the one rotation, thereby to determine the ground quantity $x_a$ which is the difference inbetween. The signal representing the ground quantity $x_a$ is fed to adaptive control calculating means 106.

On the other hand, the power calculated by required power calculating means 105 is fed to adaptive control calculating means 106 through delay means 110 having a delay time period equal to $L_1+L_2$. Thus, both the power y and the ground quantity $x_a$, which is generated as a result that the power y was given, are fed to adaptive control calculating processor means 106 after the elapse of the delay time period ($L_1+L_2$) from the actual grinding operation so that they are used as a basis for the calculating process.

As the grinding process proceeds, parameters are periodically recalculated so that the correct amount of pressure can be applied to the grinding wheel to force a grinding of the roll surface to the desired radius. In the following respective equations: letter y designates the power which was given upon the aforementioned grinding operation; characters $x_1$, $x_2$, $x_3$, $y_1$, $y_2$, $y_3$, $k_1$, $k_2$ and $k_3$ designate the parameters which were used to determine the power y upon the aforementioned grinding operation; and letter $\xi$ designates such a adaptive coefficient as has its range defined by an inequality of $0<\xi<1$ and empirically determined at 0.5 or 0.25 for example.

$$x_a \leq \tfrac{1}{2} x_1 \quad (1)$$

No change in the parameters is executed.

$$\tfrac{1}{2} x_1 < x_a \leq x_1 \quad (2)$$

Parameters $k_1'$ and $x_1'$ are determined by the following Equations and are stored as the new values of the parameters $k_1$ and $x_1$ (which are to be used as the values for the subsequent calculation of the power y):

$$k_1' = (1 - \xi)k_1 + \xi \frac{y}{x_a} \quad (3)$$

and $$x_1' = \frac{y_1}{k_1' - k_2}$$

$$x_1 < x_a \leq \tfrac{1}{2}(x_1 + x_2)$$

Parameters $k_2'$, $y_1$ and $x_1'$ are determined by the following Equations and are stored as the new values of the parameters $k_2$, $y_1$ and $x_1$:

$$k_2' = (1 - \xi)k_2 + \xi \frac{y_1 + k_2 x_2 - y}{x_2 - x_a} \quad (4)$$

$$y_1' = y_2 - (k_2' - k_3)x_2;$$

and $$x_1' = \frac{y_1'}{k_1 - k_2}$$

$$\tfrac{1}{2}(x_1 + x_2) < x_a \leq x_2$$

Parameters $k_2'$, $y_1'$ and $x_2'$ are determined by the following Equations and are stored as the new values of the parameters $k_2$, $y_1$ and $x_2$:

$$k_2' = (1 - \xi)k_2 + \xi \frac{k_1 + x_1 - y}{x_1 - x_a} \quad (5)$$

$$y_1' = (k_1 - k_2')x_1;$$

and $$x_2' = \frac{y_2 - y_1'}{k_2' - k_3}$$

$$x_2 < x_a \leq \tfrac{1}{2}(x_2 + x_3)$$

Parameters $k_3'$, $y_2'$ and $x_2'$ are determined by the following Equations and are stored as the new values of the parameters $k_3$, $y_2$ and $x_2$:

$$k_3' = (1 - \xi)k_3 + \xi \frac{y_2 + k_3 x_3 - y}{x_3 - x_a} \quad (6)$$

$$y_2' = y_2 + x_3(k_3 - k_3')$$

and $$x_2' = \frac{y_2' - y_1}{K_2 - K_3'}$$

$$\tfrac{1}{2}(x_2 + x_3) < x_a \leq x_3$$

Parameters $k_3'$, $y_2'$ and $x_3'$ are determined by the following Equations and are determined by the following Equations and are stored as the new values of the parameters $k_3$, $y_2$ and $x_3$:

$$k_3' = (1 - \xi) + \xi \frac{k_2 x_2 - y}{x_2 - x_a} \quad (7)$$

$$y_2' = y_2 + x_2(k_3 - k_3')$$

and $$x_3' = \frac{y_3 - y_2'}{k_3'}$$

$$x_3 < x_a$$

Parameters $y_3'$ and $x_3'$ are determined by the following Equations and are stored as the new values of the parameters $y_3$ and $x_3$:

$$y_3' = (1 - \xi)y_3 + \xi \times y;$$

and $$x_3' = \frac{y_3' - y_2}{k_3}$$

In the calculations of the new parameter changes of the foregoing Equatons (2) to (7), the result inconsistent with the relationship of $o<x_1<x_2<x_3$ may arise due to the calculating errors or the like in the divisions. In this case, the calculated results of the new parameters are ignored.

In case the rated load upon the motor for rotationally driving the grinding wheel is assumed to be the power $y_3$, this power $y_3$ cannot be changed so that there no change in the parameters is executed for $x_3<x_a$.

FIG. 7 illustrates that the gradients $k_1$, $k_2$ and $k_3$ are corrected to the gradients $k_1$, $k_2'$ and $k_3$ of the broken lines in the case of the Equation (3). In this case, the broken point $BP_1$ is changed to $BP_1'$ so that the following corrections are executed: $x_1 \rightarrow x_1'$; and $y_1 \rightarrow y_1'$.

The new values of the parameters thus stored are used for the subsequent calculations of the power y at power calculating means 105. If the adaptive control thus far described is performed, the pressure of the grinding wheel onto the roll can be properly controlled in accordance with the change in ground characteristics (202). Therefore, the mechanical construction of the roll grinding machine can be produced at a low cost. As will be described hereinafter, the grinding accuracy can be made sufficiently high even for the grinding machine of such type as intrincically fails to enhance the rigidity, for example, the roll grinding machine with combined upper and lower chocks.

Figure 8:
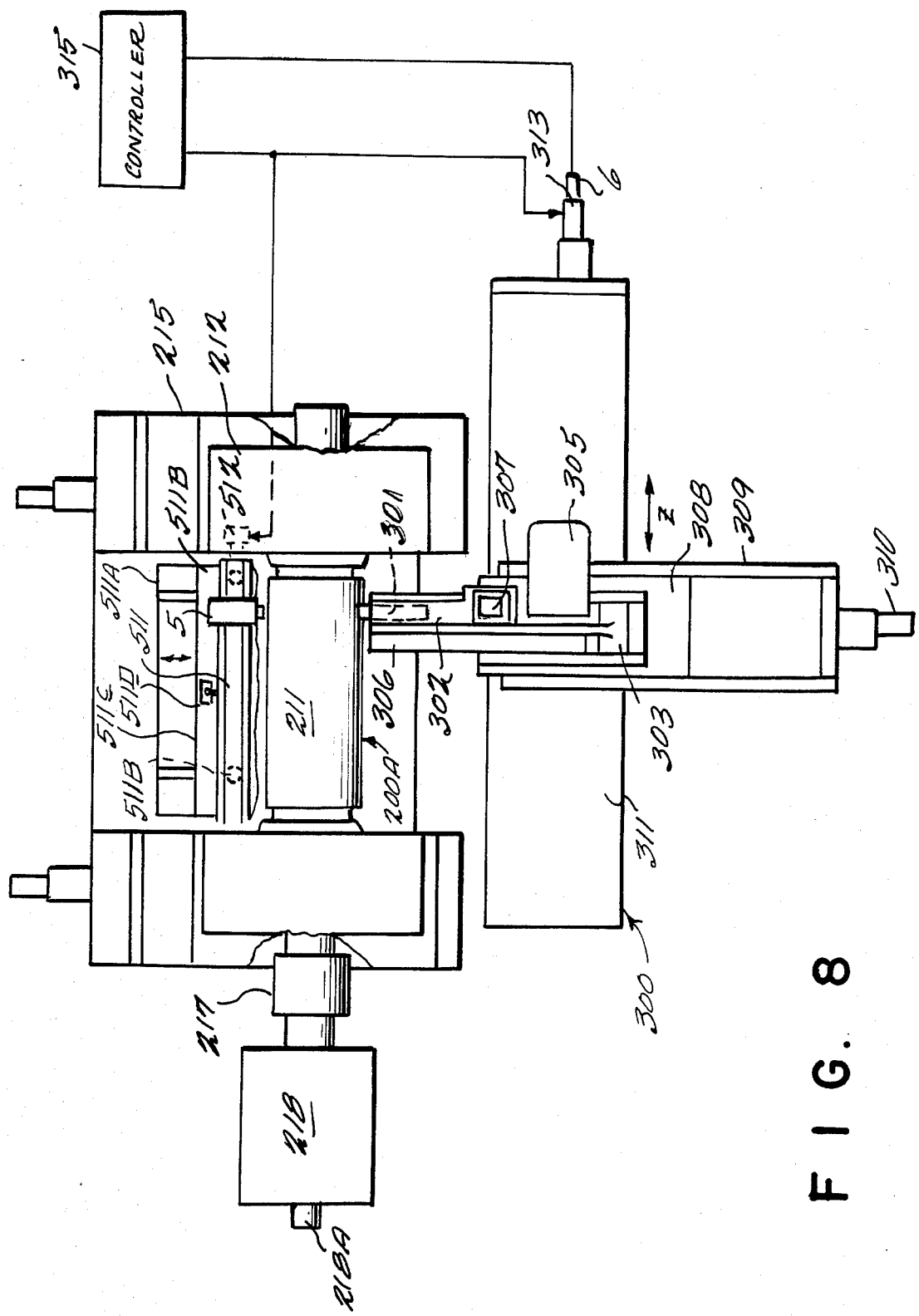
FIG. 8 is a plan view showing an essential portion of the roll grinding machine with chocks.
Figure 9:
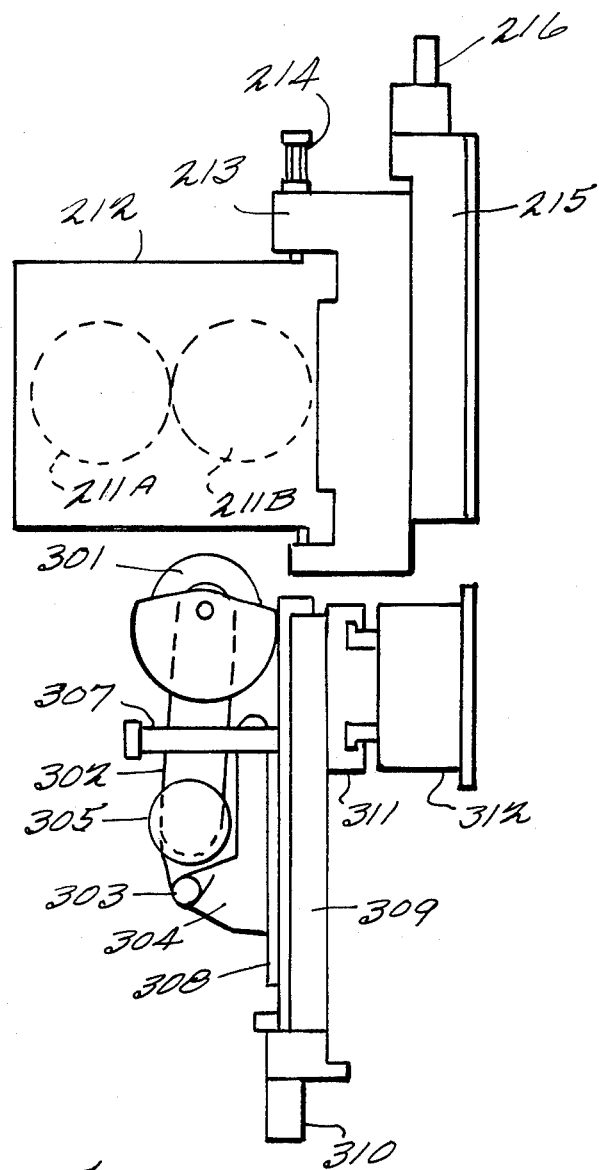
FIG. 9 is a side view of that portion of the roll grinding machine shown in FIG. 8.

This point will now be described in more detail. FIGS. 8 and 9 show the roll 200A with chocks 212, and the roll grinding machine with the chocks. In FIGS. 8 and 9, specifically, numeral 211 indicates a roll which is equipped at both its end portions with chocks 212 bearing roll 211. In the shown roll grinding machine 300, a part of rolling rolls are inserted together with the chocks from a rolling machine onto a chock carriage 213 and are fixed thereon by means of a clamping cylinder 214. Numeral 215 indicates a bed on which chock carriage position adjustor which is composed of a motor and gear box for adjusting the position of the chock carriage 213 on bed 215. At the lefthand side of FIG. 8, there is arranged a rotational roll driver 218 which is made operative to rotate roll 211 with the chocks through a coupling 217. Numeral 218A is a rotary encorder mounted on the driver including a grinding wheel 301 will be described in the following.

On a grinding wheel side bed 312, there is installed a saddle 311 which is driven in a traverse direction (i.e., in the direction Z) by a motor 313 and on which there is mounted a carriage guide 309. On carriage guide 309, moreover, there is mounted a carriage 308 which is made movable back and forth in a direction perpendicular to the direction Z by the coupling to the piston rod of a cylinder 310.

On carriage 308, there is mounted a support 304 having thereon a hinge 303, through which there is attached one end of an arm 302 having its other end attached to the grinding wheel 301.

A motor 305 is fixedly attached to the side of arm 302 is made operative to rotate grinding wheel 301 when its rotations are transmitted to the latter through a belt (not shown). Moreover, that arm 302 is enabled to rock grinding wheel 301 about the hinge 303 by a cylinder 307 which has its lower end attached to carriage 308 so as to lift grinding wheel 301 so that grinding wheel 301 can be brought to approach to either of rolls 211A and 211B.

A rail 511 on which is mounted the radius sensor 5 is slidably connected to a guide 511B and is fixed at the end of a rod of a cylinder 511D which are both arranged on an adjustable plate 511C, which is slidably provided on an base plate 511A fixed to bed 215. Therefore, radius sensor 5 may detect either radius of roll 211A and 211B.

Incidently, FIG. 8 further shows that the same signal for pulse motor 313 and 512 is fed from a roll grinding controller 315, therefore radius sensor 5 and carriage guide 309 may move with a synchronized movement.

Since, in the roll grinding machine having the construction thus far described, it is necessary during the grinding operation to advance the grinding wheel into the portion which is enclosed by chucks 212, as shown in FIG. 8, the grinding wheel has to be supported by the slender arm so that the construction of the grinding machine cannot be made intrinsically rigid. However, if the present invention is applied to that case, it is possible to provide a grinding machine which can enjoy the excellent grinding accuracy.

In FIG. 5, delay means 103, 109 and 110 may employ shift registers, for example, or may constructed by making such a program as reads the data a predetermined time period after they have been stored in the memory.

Moreover, the parameter correcting method in the foregoing respective cases illustrated in FIG. 7 is presented by way of example only, and it is possible to conceive a variety of methods how broken points $BP_i$ are corrected in accordance with the measured data ($x_a$, $y_a$) As another example, for example, it is sufficient to conceive a line, which extends through the point p in parallel with the line having the gradient $k_2$ in place of the gradient $k_2'$ in FIG. 7 and to determine the point, in which that line intersects the lines having the gradients $k_1$ and $k_3$ as a new broken point.

Figure 10:
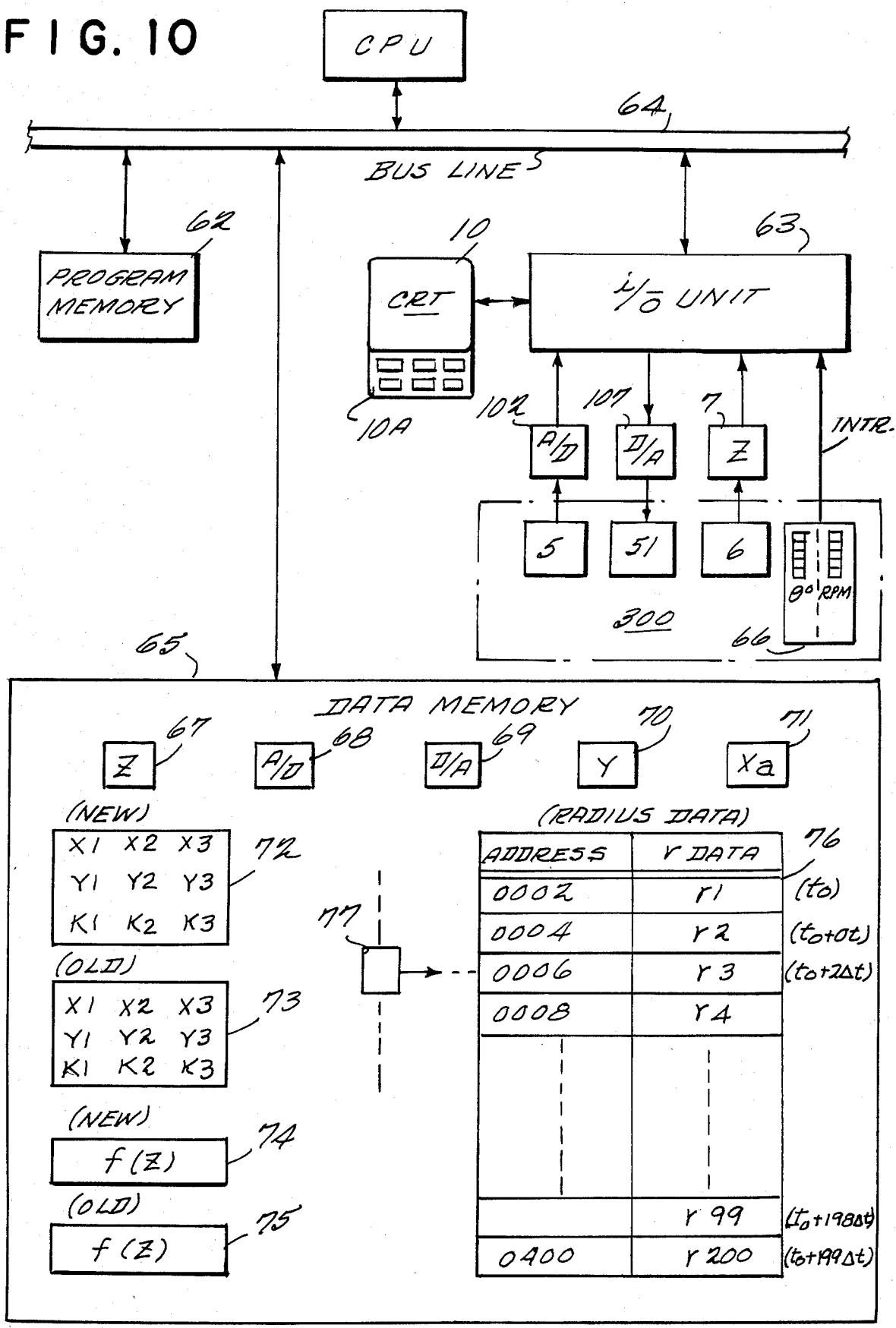
FIG. 10 is a hardware block diagram of a microcomputer system embodiment of the present invention.

Referring now to FIG. 10 there is shown a block diagram of computer 100 shown in FIG. 5.

A central processing unit (CPU) 61 is connected with a bus line 64 which connects with a program memory 62, a data memory 65 and input output unit (i/o unit) 63. Furthermore, the i/o unit connects with a CRT displaying device 10 having key board switches 10A, A/D converter 102, D/A convertor 107, Z counter 7, and an interrupt signal generating means 66. A/D converter 102, D/A converter 107 and Z counter 7 also are connected with radius sensor 5, driving means 51 and rotary encorder 6 mounted on the grinding machine 300.

The interrupt signal producing means produces an interrupt signal INTR, which is corresponding to a predetermined rotation angles of roll 1, and the frequency of the signal INTR is proportional to rotational speed of the roll, for example, assuming the predetermined rotation angle is 1.8° and the rotational speed of the roll is 30 rotations per minute, the interrupt signal generating means produces one interrupt signal INTR at each 10 m sec.

The interrupt signal generating means can be constructed by a rotary encorder mounted on roll driving means 218 shown in FIG. 8. and more conveniently, it can simply constitute by pulse generator the freuquency of which depends on the rotational speed of the roll and the predetermined rotational angle shown in this FIGURE.

Numeral 65 indicates a data memory, which includes memory areas 67 for Z counter 7, 68 for A/D converter 102, 69 for D/A converter 107, 70 for required power Y, 71 for ground quantity, 72 and 73 for new and old parameter groups $x_1, x_2, x_3, y_1, y_2, y_3, k_1, k_2, k_3$, and 74 and 75 for new and old desired radius f(Z) and 76 for radius data given by radius sensor 5.

In memory area 76, a column named "ADRS" indicates the address in which the values of radius r obtained by radius sensor 5 are stored.

Numeral 77 indicates a pointer which designates an address instructed by CPU 61. In this FIGURE total numbers of interruption corresponding to one rotation of roll 1 equals to 200.

In case that each radius data r needs two bites to store its values, each address number goes up by two.

Moreover, the timing corresponding to each interrupt signal is provided at the right side of the column "r data". Therefore, in case that Δt equals 10 m sec, it takes just two hundred interruptions proceed from address "2" to "400". The pointer reach returned to address 002 after the address pointer reaches to address number 400.

Figure 11:
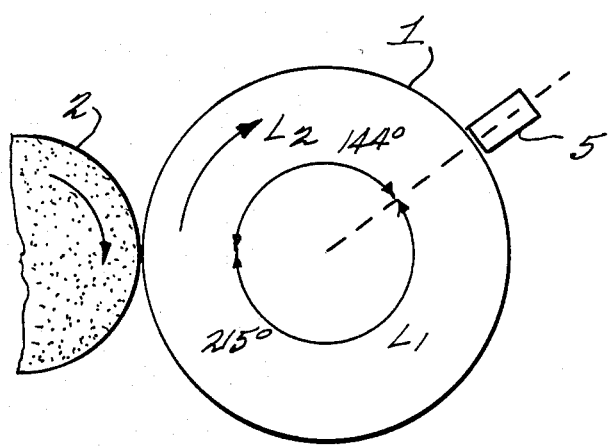
FIG. 11 is a sectional view illustrating the positional relationship of the grinding wheel and radius sensor about the circumference of the roll being ground.

For example, in FIG. 11, the numbers N(L1) of interruption corresponding to L1 becomes as follows:

$$N(L_1 + L_2) \cdot \frac{360 - 144}{360} = 120$$

where $N(L_1 + L_2) = 200$

Figure 12C:
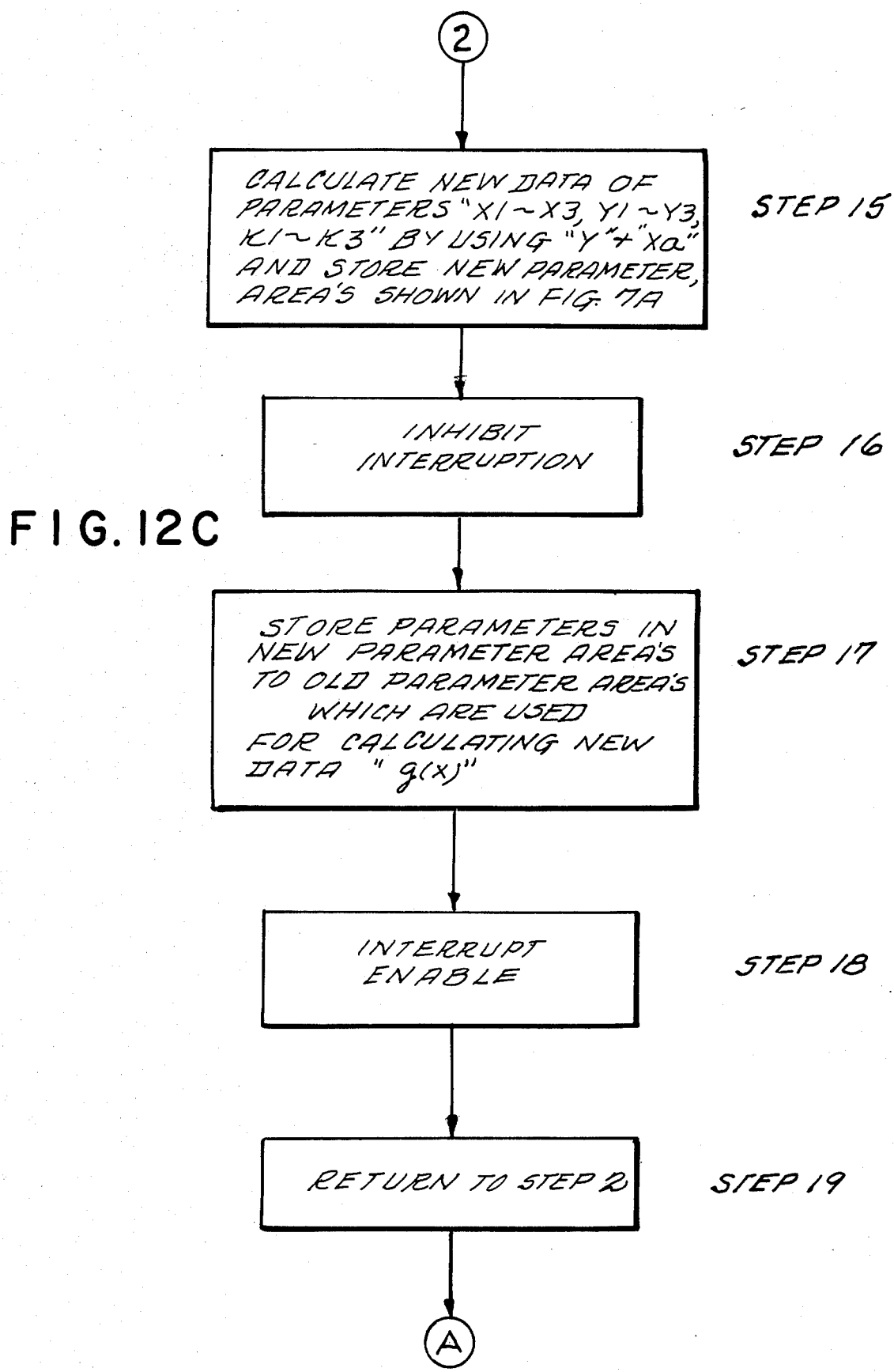
FIG. 12 (including FIGS. 12A–12E) is a flow chart explaining the operation of the micro-computer embodiment by setting forth functionally the program steps stored in program memory.

FIG. 12 (including 12A–12E) is a flow chart detailing a series of instructions to CPU 61. In FIG. 12A, step 1 indicates start of CPU 61, then program step proceeds to step 2. At step 2, CPU 61 tests push button switches and limit switches mounted on the roll grinding machine. At next step 3, CPU 61 switches electric valves and contractors on the machine, if necessary. At step 4, CPU 61 tests key board switches 10A on the CRT displaying means, and changes the picture on the CRT, if necessary at step 5. At next step 6, CPU 61 modifies the coefficient of desired radius f(Z). CPU 61 picks up an address which the pointer indicates and saves the number of the address as an appointer for background job at step 7, and calculates an new address which is less than the address being indicated by the pointer by the numbers of interruption corresponding to $L_1$, that is 216°, as shown in FIG. 11 at step 8. At step 9, CPU 61 saves the radius data stored in the new address as values of $y_2$, then calculates an address by subtracting the numbers of interruption on one rotation of the roll, from the address number obtained at step 10. At step 11, CPU 61 saves the radius data of the address obtained at step 10 as values of r1. Then, CPU 61 calculates r1-r2 and saves the results of calculation to $x_a$ at step 12, at next step 13, CPU 61 calculates "exclusive or operation" between "0400" and the address numbers indicated by the pointer for background job and calculates an address obtained by subtracting 0400 from the results of the exclusive OR operation.

At next step 14, CPU 61 saves the radius data of the address obtained at step 13 as values of y.

At step 15, CPU 61 calculates new data of parameters $x_1 \sim x_3, y_1 \sim y_3, k_1 \sim k_3$ by using the y and $x_a$ obtained at step 14 and step 12, and saves them at new parameters areas 72 shown in FIG. 10.

At step 16, interruption to CPU 61 is forbidden and at step 17, CPU 61 stores new parameters in new parameters areas to old parameter areas which are used to calculate new data of g(x) shown in FIG. 5. And at step 18. CPU 61 comes again to the state of "interrupt enable".

Figure 12E:
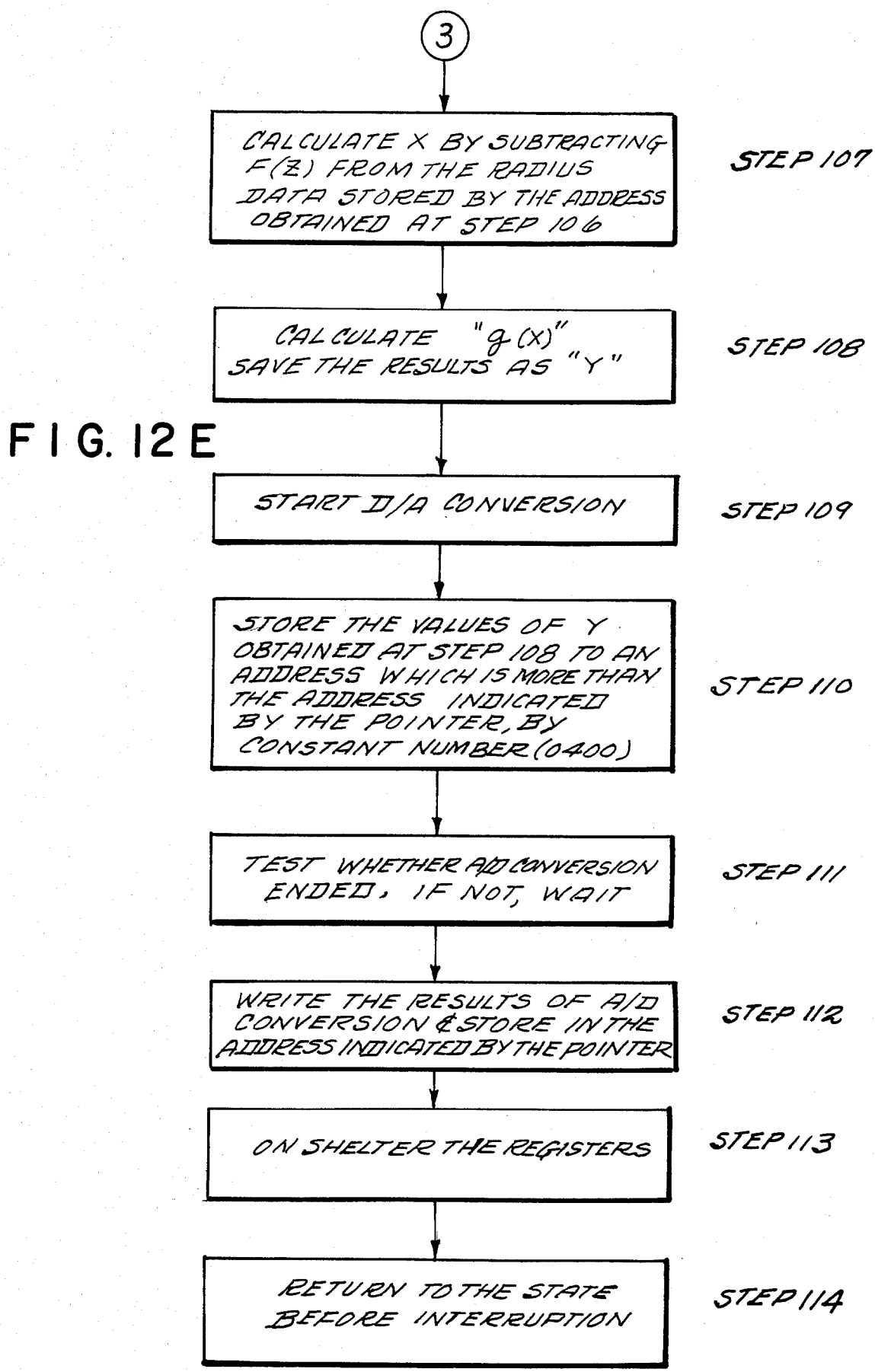

FIG. 12D and 12E illustrate program steps being proceeded by CPU 61 when an interruption signal is provided. Referring now to FIG. 12D, FIG. 12E, at step 100, interrupt signal INTR is given and then, CPU 61 executes the transactions for the signal INTR, such as sheltering registers. At step 102, CPU 61 instructs A/D converter 102 to start A/D conversion, then it indexes the pointer at step 103. Next, CPU 61 writes the value of Z counter 7 to the register at step 104 and at step 105, it calculates "f(Z)", then it also calculates an address which is less than the address indicated by the pointer by the times of interruption corresponding to $L_1$.

At step 107, CPU 61 calculates x by subtracting f(Z) from the radius data stored in the address obtained at step 106, next to calculates "g(x)" by using x obtained at step 107 and saves the results as y at step 108. At step 109, CPU 61 instructs D/A converter to start D/A conversion and it stores the values of y obtained at step 108 to an address which is more than the address indicated by the pointer, by constant number (0400), at step 110, then CPU 61 test whether A/D conversion already ended, and if not, it waits at step 111. And, CPU 61 writes the results of A/D conversion and stores it in the address indicated by the pointer at step 112, then CPU 61 makes the sheltered registers to come to work again at step 113, and at step 114, CPU 61 returns back to the state before interruption.

It is further understood by those skilled in the art that the foregoing description is a preferred embodiment of the disclosed device and that various changes and modifications may be made in the invention without departing the spirit and scope thereof.

What I claim is:

1. A control system for a roll grinding machine, comprising:

means for rotating a roll to be ground;

a grinding wheel for grinding the roll;

means for rotating the grinding wheel;

means for moving the grinding wheel longitudinally parallel to an axis of the roll;

means for sensing the power being expended by the grinding wheel rotating means and generating an actual power signal indicative thereof;

means for detecting an actual radius of the roll at the longitudinal position of the grinding wheel and providing an actual radius signal indicative thereof;

means for detecting the longitudinal position of the grinding wheel and generating a longitudinal position signal indicative thereof;

desired radius producing means for producing a desired radius signal representing a desired radius corresponding to the longitudinal position signal; and desired power producing means for producing, responsive to a predetermined function of the actual and desired radius signals, a desired power signal; and grinding wheel driving means for pressing said grinding wheel against said roll with a pressure that is a function of said desired power signal and said actual power signal so as to minimize any difference between actual and desired power.

2. A control system according to claim 1 wherein said desired power producing means comprises:

a first delay means for delaying the actual radius signal for a first time period representing the time interval required for the roll to rotate from the circumferential position of the roll at which the radius detecting means is positioned to the circumferential position of the roll at which the grinding wheel is positioned;

a second delay means for delaying an output signal of the first delay means for a second time period representing the time interval required for the roll to circumferentially rotate once;

a first calculating means, responsive to output signals of the first and second delay means for calculating an amount of of radius removed during one rotation of the roll;

a second calculating means, responsive to output signals from the first delay means and desired radius producing means, for calculating an amount of radius to be removed from the roll;

a power calculating means for calcualting said desired power signal corresponding to the radius to be removed as provided by the second calculating means;

a third delay means for delaying the desired power signal for a time corresponding to the interval of time required for the roll to make one rotation; and a parameter producing means responsive to the third delay means and first calculating means for producing parameters required for defining the relationship between the radius to be removed and the desired power signal and modifying the operation of the power calculating means by updating parameters used in calculating the desired power as necessary with new parameters provided by the parameter producing means.

3. A control system for a roll grinding machine as in claim 1, wherein said desired power producing means comprises:

a computer system including a central processing unit (CPU);

an input/output unit, program memory and data memory coupled to the CPU, and an interrupt signal producing means for interrupting the CPU;

said input/output unit being coupled to the driving means via a digital to analogue converter, said program memory having a series of instructions stored therein for instructing said CPU to calculate a desired power in accordance with the output signals of said radius detecting means and desired radius producing means.

4. A control system for a roll grinding machine according to claim 3, wherein said interrupting signal producing means comprises a rotary encoder mounted on said roll rotating means.

5. A control system for a roll grinding machine as in claim 3, wherein said interrupting signal producing means comprises a timing signal producing device which generates a timing signal having a frequency determined by the values of a roll rotation speed and a roll rotation angle corresponding to one interruption of the CPU.

6. A control system for a roll grinding machine as in claim 2, wherein said data memory inclues a memory area for storing parameters which define relationships between a radius to be ground and a power required for grinding operation.

7. A control system for a roll grinding machine as in claim 6, wherein the relationships can be graphically represented by a plurality of broken lines.

8. A control system for a roll grinding machine as in claim 3, wherein said data memory includes a memory area for storing radius data detected by said radius detecting means.

9. A control system for a roll grinding machine as in claim 8, wherein addresses of said memory area corresponding to each detected radius data are consecutive.

10. A control system for a roll grinding machine as in claim 3, wherein said data memory includes a memory area for storing a desired radius in the form of functions of the longitudinal direction of the roll.

11. A control system for a roll grinding machine as in claims 2 or 3, wherein said desired radius producing means comprises:

a setting means for predeterminedly setting a desired radius of the roll as a function of the longitudinal position of the roll and for producing a signal representing the desired radius corresponding to the longitudinal position of the roll at which the roll is being ground.

12. A control system according to claim 11, wherein, said setting means further includes displaying means for displaying a representation of said roll, and wherein said desired radius producing means further includes a light pen and key board switches for controlling the setting of desired radius as a function of longitudinal direction.

13. A control system according to claim 12 wherein, said displaying means comrises a cathode ray tube.

14. A control system according to claim 1 wherein said radius detecting means comprises:

a sensor means for producing a signal corresponding to the distance between the roll surface and a sensing element mounted on it; and an first moving means for moving said sensor means along the axial direction of the roll electrically or mechanically synchronized with the movements of the grinding wheel.

15. A control system according to claim 13, wherein, said radius detecting means further includes a position adjusting means for adjusting the position of the sensor means to the vertical directions.

16. A control system according to as claim 14 wherein said detecting means further provides second moving means for moving said first moving means to the direction perpendicular to said axis of the roll.

17. A control system according to as claim 15 wherein said detecting means further provides second moving means for moving said first moving means to the direction perpendicular to said axis of the roll.

18. A control system according to claim 14 wherein said sensor element comprises: a nozzle for applying a jet of air onto the roll surface and back pressure measuring means for measuring the pressure in the nozzle and for producing a signal corresponding to the measured value.

19. A control system according to claim 15 wherein said sensor element comprises: a nozzle for applying a jet of air onto the roll surface and back pressure measuring means for measuring the pressure in the nozzle and for producing a signal corresponding to the measured value.

20. A control system according to claim 16 wherein said sensor element comprises: a nozzle for applying a jet of air onto the roll surface and back pressure measuring means for measuring the pressure in the nozzle and for producing a signal corresponding to the measured value.

21. A control system according to claim 14 wherein said sensor element comprises a electric micrometer.

22. A control system according to claim 15 wherein said sensor element comprises a electric micrometer.

23. A control system according to claim 16 wherein said sensor element comprises a electric micrometer.

24. A control system according to claim 1 wherein, said driving means comprises a hydraulic servo valve and a pressure sensor for measuring a pressure of an output port of the servo valve.

25. A control system according to claim 1 wherein said rotating means further comprises a power sensor for measuring the power being used in grinding operation.

26. A control system according to claim 25, wherein said power sensor comprises an electric current detector which detects the armature current of the grinding wheel drive motor.

27. A control system according to claim 1 wherein said roll grinder comprises a roll grinder with chucks.

28. A control system according to claim 1 wherein said position detecting means includes a rotary encoder connected to said means for moving the grinding wheel to the direction of roll axis.

* * * * *